United States Patent [19]

Mayer

[11] 4,192,966
[45] Mar. 11, 1980

[54] CIRCUIT ARRANGEMENT FOR DETERMINING SPECIFIC CHARACTERS OCCURRING DIRECTLY CONSECUTIVELY IN A SEQUENCE OF CHARACTERS, IN PARTICULAR FOR TELEPRINTER EXCHANGE SYSTEMS

[75] Inventor: Max Mayer, Unterpfaffenhofen, Fed. Rep. of Germany

[73] Assignee: Siemens Aktiengesellschaft, Berlin & Munich, Fed. Rep. of Germany

[21] Appl. No.: 938,986

[22] Filed: Sep. 1, 1978

[30] Foreign Application Priority Data

Sep. 21, 1977 [DE] Fed. Rep. of Germany ....... 2742476

[51] Int. Cl.² .......................... G06F 7/02; H04L 15/00
[52] U.S. Cl. .............................. 178/3; 340/146.3 WD
[58] Field of Search ................ 178/2 R, 3, 17.5, 23 R, 178/30; 179/90 B, 90 BB, 90 BD; 340/146.3 WD, 146.2

[56] References Cited

U.S. PATENT DOCUMENTS

| 3,243,775 | 3/1966 | English ............................ 340/146.2 |
| 3,855,576 | 12/1974 | Braun et al. .............. 340/146.3 WD |

FOREIGN PATENT DOCUMENTS

| 1147970 | 5/1963 | Fed. Rep. of Germany ........ 340/146.2 |
| 1762503 | 1/1975 | Fed. Rep. of Germany ........ 340/146.2 |

*Primary Examiner*—Thomas A. Robinson

*Attorney, Agent, or Firm*—Hill, Van Santen, Steadman, Chiara & Simpson

[57] ABSTRACT

A circuit arrangement for determining specific characters which occur directly consecutively in a sequence of characters, wherein at least one established sequence of characters in a likewise established frequency emits a message signal which can be used to trigger control processes only in the event that characters comprising an established sequence of character elements have occurred in a likewise established frequency directly consecutively in the sequence of characters. The invention is particularly useful in teleprinter exchange systems and is particularly characterized in that the character elements of each character are used to operate a memory which, only when an established sequence of character elements is contained in the relevant character, emits control signals which are characteristic of the sequence of character elements to an evaluation circuit. A counter is connected behind the evaluation circuit and the evaluation circuit is designed in such a manner that only by emission of the specific control signals is it able to trigger counting processes in the counter. The counter executes a counting process only in the event that the control signal with which it has been supplied by the evaluation circuit is identical to the control signal with which it has been previously supplied, whereas on the occurrence of a control signal which differs from the control signal previously supplied to the counter, the counter is set to an established count.

12 Claims, 1 Drawing Figure

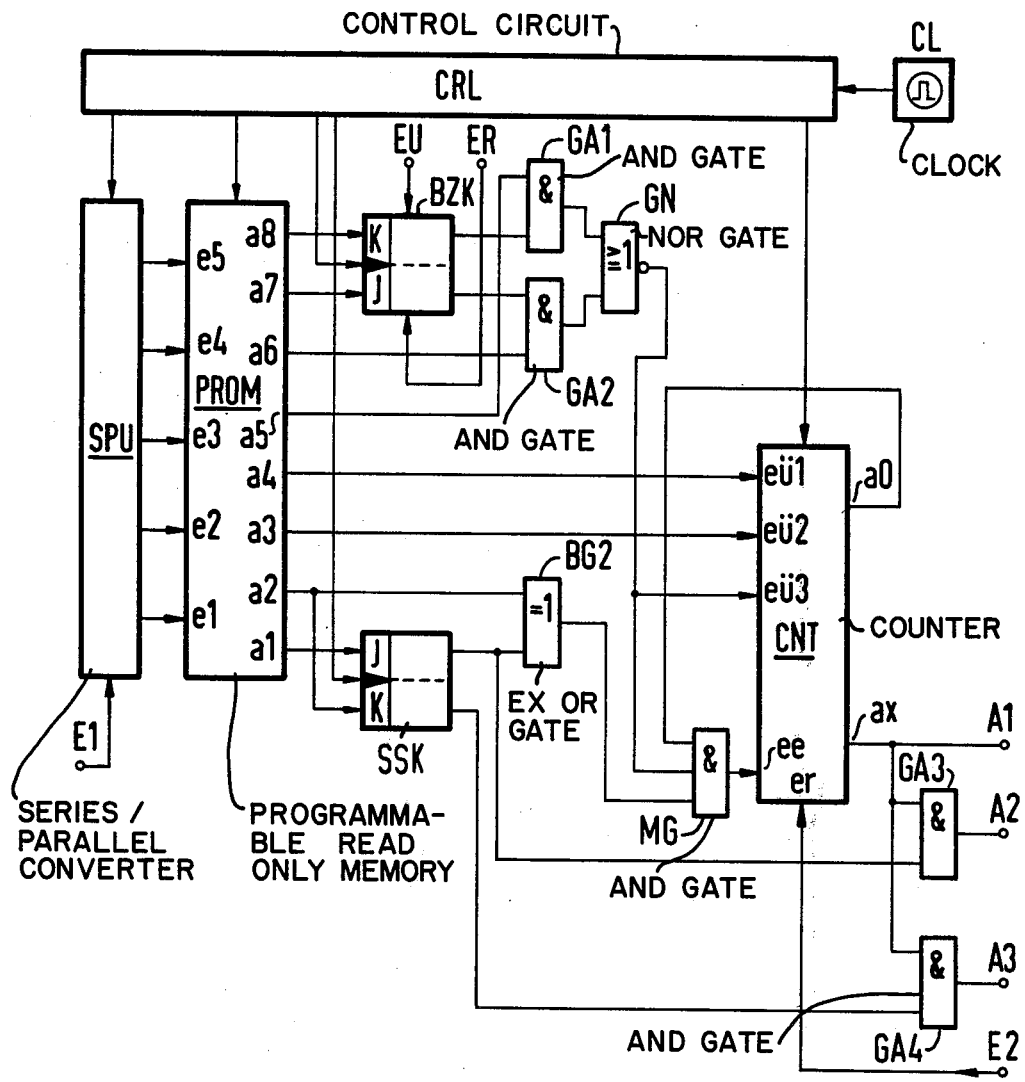

CIRCUIT ARRANGEMENT FOR DETERMINING SPECIFIC CHARACTERS OCCURRING DIRECTLY CONSECUTIVELY IN A SEQUENCE OF CHARACTERS, IN PARTICULAR FOR TELEPRINTER EXCHANGE SYSTEMS

BACKGROUND OF THE INVENTION

1. Field of the Invention

The present invention relates to a circuit arrangement for determining specific characters occurring in a sequence of characters comprising at least one established sequence of character elements in a likewise established frequency, and for the emission of a message signal which can be used to trigger control processes only in the event that characters comprising an established sequence of character elements in a likewise established frequency have occurred directly consecutively in the sequence of characters, and more particularly for such circuits which are useful in teleprinter exchange systems.

2. Description of the Prior Art

A circuit arrangement of the type briefly described above, which is also referred to as a character sequence or symbol sequence recognition device, is already known in the art, for example from the U.S. Pat. No. 3,243,775. However, with the aid of this known circuit arrangement it is only possible to determine a specific sequence of binary digit signals from a number of consecutively occurring binary digit signals. Since a magnetic core storage arrangement is used in the known circuit arrangement to establish a character sequence or smybol sequence, it is not possible to modify the character sequence or symbol sequence which is to be taken into account in a simple manner.

A circuit arrangement is also known for establishing the existence of and analyzing teleprinter character sequences of a specific type and length for the purpose of further processing (treatment, guidance, further transmission or re-coding) of the teleprinter communications contained in the latter in telecommunications, in particular teleprinter exchange systems, such as found in the allowed German Application 11 47 970. In this known circuit arrangement, each of the teleprinter lines connected to a teleprinter exchange device is assigned its own intermediate memory having a storage capacity which is sufficient for one single teleprinter character. Also provided in an analysis device which is common to all the teleprinter lines connected to the relevant teleprinter exchange device and which can be connected by a connection device operated in time multiplex in time sequence to the individual intermediate memories assigned to the lines, and non-destructively reads out the teleprinter character stored in the memories and supplies the same to the analysis device. The analysis device contains a short-term memory for a number, which remains constant (for example 8) of teleprinter characters which are compared in a comparison device, having a given program, for identity with the latter. In the event of the identity of the teleprinter character sequence contained in the short-term memory with the given program, this comparison device will easily signal, whereupon the entire teleprinter character sequence is transferred, unchanged, into a data memory, whereas in the case of non-identity and the establishment of a new teleprinter character in the respective intermediate memory of the line, the teleprinter character which has been stored for the longest time is erased and replaced by the new teleprinter character at the end of the teleprinter character sequence following the last teleprinter character to have been input, and thus, the teleprinter character sequence is input into the data memory in modified form. Also in this known circuit arrangement, the directly consecutive occurrence of specific, in each case identical, teleprinter characters, is not used to trigger special message signals. Moreover, the above-considered known circuit arrangement involves a relatively high circuit expense which occurs, in particular, due to the special manner in which the analysis device is operated.

Finally, a circuit arrangement is also known for the evaluation and recognition of a specific character sequence, which consists of a given number of element-coded characters, which are identical to one another and each contain only a single polarity change, in telecommunication systems, in particular teleprinter exchange system, such as disclosed in German Patent 17 62 503. However, nothing is known in this connection regarding the evaluation and recognition of a specific character sequence which consists of a given number of identical characters of arbitrary form.

SUMMARY OF THE INVENTION

The primary object of the present invention is to provide a circuit arrangement of the type generally described above in which identical characters occurring in an established frequency within a sequence of characters can be established in a relatively simple manner and can be used to emit a message signal as a result of which control processes can be triggered.

This object is achieved, according to the present invention, in a circuit of the type generally mentioned above in that the character elements of each character are used to operate a memory which, only when an established sequence of character elements occurs in the relevant character, emits a control signal characteristic of this sequence of character elements to an evaluation circuit which precedes a counter. The evaluation circuit is designed in such a manner that only as a result of the emission of the specific control signals is it able to trigger counting processes in the counter, the counter then executing a counting process only in the event that the control signal with which it has been supplied from the evaluation circuit is identical to the control signal with which it has been previously supplied. Upon the occurrence of a control signal which differs from the control signal previously supplied to the counter, the counter is reset to a starting counter position.

This results in the advantage that a relatively low circuit expense is necessary in order to estabish specific characters in a sequence of consecutive characters and to emit a message signal which can be used to trigger control processes only when an established character has occurred in a predetermined frequency. Moreover, it is possible, in a particularly simple manner, to monitor the sequence of consecutively occurring characters not only for the presence of a specific character, but also for the presence of a plurality of specific characters. In this case, the frequency in which the relevant character must occur in succession in order to emit an appropriate message signal can be established individually for each character.

According to a particular advantageous feature of the invention, in order to establish a deviation between a control signal corresponding to a first character which is to be taken into consideration and a control signal corresponding to a second character which is to be taken into consideration, the output of the memory which emits the control signals is connected to a memory trigger stage which stores the control signal previously emitted by the memory, and an output of the memory trigger stage and an output of the memory, which emits the control signals, are connected to a logic element which, at its output, is connected to an enabling input of the counter. As a result of this structure, which employs the so-called last-look principle, the advantage is gained of being able to determine the occurrence of different characters in the consecutively occurring characters in a particularly simple manner.

In accordance with another advantageous feature of the invention, in the reception and analysis of teleprinter characters comprising characters which differ from one another and which separately indicate the occurrence of consecutive letter characters and digit characters, these separate characters are stored in an evaluation trigger stage and in a character evaluation logic circuit are logically linked to evaluation signals which are emitted by the memory, together with each emission of a control signal, and which indicate whether the teleprinter character which has just occurred is to be evaluated as a letter character or as a digit character, or is to be evaluated at all. This results in the advantage that, in a relatively simple manner in the evaluation of teleprinter characters, it is possible to establish whether the teleprinter characters which are to be taken into consideration are to be used as letter characters, as digit characters, or in any case to operate the counter.

According to another advantageous feature of the invention, it is of advantage in the previously-considered structural features if the evaluation trigger stage is connected at its input to separate outputs of the memory, at which the memory is able to emit signals characteristic of letter characters or digit characters in response to letter characters (Bu) or digit characters (Zi) with which it has been supplied. In this manner, the relevant memory can be additionally used to control the setting-up of the evaluation trigger state, which is favorable in respect of the normally-required circuitry layout.

In accordance with another particular advantageous feature of the invention, the logic element which is connected at its input to the memory and to the memory trigger stage is connected at its output via a further logic element which fulfills an OR FUNCTION to the enabling input of the counter, and the further logic element is connected by a further input to the output of the character evaluation logic circuit. This advantageously results in a particularly simple control of the counter in respect of resetting and in respect of enabling and control of counting processes.

Another advantageous feature of the invention finds the counter connected by an output thereof which emits an output characteristic of its starting count to a further input of the previously-mentioned further logic element. This insures, in a particularly simple manner, that the first character to be evaluated which occurs following a character which is not to be evaluated—and in response to the occurrence of which the memory emits an appropriate control signal—leads to the enabling of a counter for the subsequent execution of counting processes.

In accordance with another advantageous feature of the invention, the counter is connected by special transfer inputs to separate outputs of the memory at which established counter setting-up signals occur which are associated with the particularly emitted control signals, and which are used to set-up the counter only in the event that the control signal by which they are accompanied differs from the control signal which has occurred directly beforehand, and furthermore one single counter output of the counter serves to emit the message signals. In this manner it is possible in a particularly simple manner, to establish the frequency with which the characters to be established must occur directly consecutively in order to allow a message signal to be emitted from the counter. In addition, in a particularly simple manner, this structure allows character sequences, each consisting of a different number of identical characters, to be established in the sequence of consecutively occurring characters.

According to another particularly expedient development of the invention, the output of the counter, on the one hand, and the output of the memory trigger stage, on the other hand, are connected to the inputs of logic elements, which at their outputs emit message signals in the event that a character which is to be taken into consideration has occurred directly consecutively in a frequency established for this character in a sequence of characters. Therefore, this structure provides a particularly simple distinguishing facility between characters which are to be taken into consideration and which have occurred directly consecutively in a frequency established for such character.

According to another expedient development of the invention, an advantage in the previously-considered expeditious development consists in that, following the evaluation of the relevant message signal, the counter can be reset by a processing device to its starting count. This structure advantageously allows corresponding sequences of characters to be determined uninterrupted and to be analyzed producing a corresponding message without any of these characters remaining unconsidered.

According to another advantageous feature of the invention, the memory comprises a plug-in, possibly programmable read only memory. This structure advantageously facilitates a particularly simple modification of the characters which are to be determined and taken into consideration and in the frequency with which these characters must occur directly consecutively in order to trigger the emission of a corresponding message signal.

In order to be able to use the relatively inexpensive memories currently commercially available and featuring parallel input, the character elements which are serially-occurring characters, are expediently supplied to the memory by way of a series-parallel converter.

BRIEF DESCRIPTION OF THE DRAWING

Other objects, features and advantages of the invention, its organization, construction and mode of operation will be best understood from the following detailed description taken in conjunction with the accompanying drawing, on which there is a single FIGURE which is a schematic logic diagram of an exemplary embodiment of the invention.

DESCRIPTION OF THE PREFERRED EMBODIMENTS

Referring to the drawing, there is fundamentally shown three main circuit components, namely a memory PROM, a counter CNT and an evaluation circuit which is connected between the output of the memory PROM and the input of the counter CNT, comprising a number of circuit elements which will be discussed in detail below.

The memory PROM, in the present situation, will be assumed to comprise an interchangeable, programmable read-only memory, and it is connected by a plurality of input terminals e1, e2, e3, e4, e5 to outputs of a series-parallel converter SPU, which is connected by its input to an input terminal E1, at which characters consecutively occur, each character consisting of a specific number of character elements and which are to be checked for the presence of a given sequence of character elements. These characters will be assumed, in particular, to consist of teleprinter characters of the CCITT No. 2 Alphabet which each consist of a start character element, five consecutively occurring information character elements, and a closing stop character element. Of the seven character elements, in the present case only the five information character elements are fed to the memory PROM from the series-parallel converter SPU. At this point, it should be noted that the use of the series-parallel converter SPU assumes that the character elements of the characters to be supplied to the input terminal E1 occur in serial fashion. If, on the other hand, the character elements of the characters to be taken into consideration, appear in parallel on a corresponding number of lines, these character elements can be directly fed to the inpus e1-e5 of the memory PROM. Under these circumstances, the series-parallel converter SPU could be omitted.

The memory PROM includes a number of ouputs a1-a8 at which, in response to appropriate operation of the inputs e1-e5 of the memory PROM, there occur signals whose significance will be discussed briefly in the following. First of all, however, it should be noted that the circuit arrangement illustrated on the drawing is designed in such a manner that it enables the monitoring and evaluation of two different characters in respect of occurrence in established frequencies.

A control signal comprising the signal bits "1", "0" occurs at the two outputs a1, a2 of the memory PROM whenever the inputs e1-e5 of the memory PROM are supplied with a specific character to be evaluated. On the other hand, a control signal comprising the bit combination "0", "1" occurs at the outputs a1, a2 of the memory PROM whenever a further character to be evaluated is supplied to the inputs e1-e5 of the memory PROM. On the occurrence of all of the other characters at the inputs e1-e5 of the memory PROM, a control signal comprising the bit combination "0", "0" occurs at its outputs a1, a2.

Together with the emission of control signals from the outputs a1, a2 of the memory PROM, counter setting-up signals occurs at the outputs a3, a4 of the memory PROM, and, in the present case, only the bit combinations "1", "0", and "0","1" and "0","0" corresponding to the associated counter settings at the counter value 3, 4, 5, respectively, can occur.

At the outputs a5, a6 of the memory PROM, together with the control signals emitted from the outputs a1, a2, there occur evaluation signals which indicate whether the character which has led to the emission of the relevant control signal is to be evaluated as a letter character (Bu), a digit character (Zi) or neutrally, i.e. in any case and irrespectively of whether this is a letter character or a digit character.

At the outputs a7, a8 of the memory PROM there occurs a setting-up signal which consists of two bits and which, having the bit combination "1", "0", is characterized of the letter character (Bu) and having the bit combination "0", "1" is characteristic of the digit character (Zi). These setting-up signals are emitted from the memory PROM when the letter character (Bu) and digit character (Zi) are fed to its inputs e1-e5.

The two outputs a1, a2 of the memory PROM are connected to the J and K inputs, respectively, of a JK flip-flop memory trigger stage SSK. An output of the memory trigger stage SSK and the output a2 of the memory PROM are connected to an EXCLUSIVE-OR gate BG2. The output of the gate BG2 is connected to an input of an AND gate MG which fulfills an OR-function (the OR-function corresponding to a negative logic link). The gate MG is connected by its output enabling input ee of the counter CNT. The gate MG is connected by another input to the output of a NOR- gate GN which is connected by its inputs to the outputs of two AND gates GA1, GA2. Together with the NOR gate GN, these two AND gates GA1 and GA2 form a character evaluation logic linking circuit. The AND gates GA1, GA2 are connected by their inputs to the evaluation outputs a5, a6 of the memory PROM and are connected by others of their inputs to the outputs of a JK flip-flop evaluation trigger stage BZK, which is connected by its inputs JK to the setting-up outputs a7, a8 of the memory PROM. The trigger stage BZK is connected by separate setting-up inputs to input terminals EU and ER. From these input terminals EU, ER, the trigger stage BZK can be brought into one of its two stable states which can be valuable, in particular when the circuit arrangement is set in operation. Then, the input terminal EU can be supplied with so-called polarity reversal data which sets up the trigger stage BZK in such a manner that it indicates the occurrence of following digit characters. By supplying so-called polarity restoration data to the input terminal ER, the trigger stage BZK can then be set up in such a manner that it indicates the occurrence of following letter characters.

The aforementioned gate MG is connected by a further input to an output a0 of the counter CNT. A "0" signal occurs at the output a0 of the counter CNT only when the counter CNT occupies its starting count, which can be the zero position; otherwise a "1" signal occurs at the output a0 of the counter CNT.

The counter CNT has a further output ax at which, when a specific count is reached, a "1" signal occurs, which in the present case is used as a message signal. The output ax of the counter CNT is connected, on the one hand, to an output terminal A1 of the circuit arrangement. On the other hand, the output ax of the counter CNT is connected to an input of each of two AND gates GA3, and GA4. The AND gates GA3 and GA4 are connected by their other inputs to the outputs of the memory trigger stage SSK. The output of the AND gate GA3 leads to an output terminal A2 and the output of the AND gate GA4 leads to an output terminal A3.

In addition to the previously-considered loading and counter enabling inputs ee, the counter also has, for example, four further inputs, namely three transfer inputs eu1, eu2, eu3 and a resetting input er. The transfer inputs eu1 and eu2 are directly connected to respective outputs a4 and a3 of the memory PROM; as will become apparent from the following, these inputs serve to receive the binary signal combination present at the outputs a3, a4 of the memory PROM in order to pre-set the counter CNT. The transfer input eu3, which is connected to the output of the aforementioned NOR gate GN, serves to receive the binary signals ("0" or "1") in each case emitted from the output of the gate GN in order to set the counter CNT to its zero position or, in combination with the bits present at the transfer inputs eu1, eu2, into its start position. The resetting input er is connected to an input terminal E2 of the circuit arrangement. This input terminal E2 will be assumed to be connected to an output of a processing device (not illustrated) which can be connected by its input to the output terminals A1, A2, A3. When the described circuit arrangement is used in a known electronic data exchange system (such as described for example in the magazine "Der Fernmelde-Ingenieur" 26th Edition, Vol. 5, May 15, 1972), the input terminal E1 can be connected to an output code converter which is provided for operating lines which feed characters in the outgoing transmission direction, whereas the input terminal E2 and the output terminals A1, A2, A3 of the circuit arrangement can be connected to an input code converter provided for operating lines which feed characters in incoming transmission directions. This operation of the input code converter means that the latter is required to carry out specific reactions which are governed by the supplied message signals, for example the allocation of charges to the teleprinter subscriber station participating in a connection, as a calling subscriber station.

For control of individual circuit components illustrated on the drawing there is also provided a control circuit CRL, which follows a pulse generator CL and which is basically to be considered as a pulse train distributor. This control circuit CRL feeds the series-parallel converter SPU with timing pulses whose frequency and position are such that the character elements which occur consecutively at the input terminal E1 can also be introduced into the series-parallel converter SPU. A separate pulse train control input of the memory PROM is supplied by the control circuit CRL at a suitable time following the introduction of the character elements belonging to a character into the series-parallel converter SPU, with appropriate pulse train control pulses in order to operate the storage cells belonging to this memory by means of the bits present at the inputs e1-e5 of the memory so that the signals in question occur at the corresponding outputs a1-a8 of the memory PROM.

The pulse train inputs of the two JK trigger stages BZK and SSK are supplied from the control circuit CRL with corresponding pulse train control signals in each case following the occurrence of control signals at the associated inputs J and K.

A separate pulse train control input of the counter CNT is supplied from the control circuit CRL with pulse train control signals at those times at which the inputs ee, e1, eu1, eu2 are supplied with signals. In this manner, the pulse train control signals emitted from the control circuit CRL always serve to receive and process the signals present at inputs of the corresponding circuit elements in the associate circuit arrangement.

In the following, the mode of operation of the circuit arrangement illustrated on the drawing will be explained in detail. First of all, it will be assumed that none of the characters supplied to the input terminal E1 represents a character which is to be determined and thus as it were evaluated from the sequence of consecutively occurring characters. This means that the bit combination "0", "0" is present at the outputs a1, a2, of the memory PROM. The bit combination "0","0" also occurs at the outputs a3, a4 of the memory PROM. On the other hand, the bit combination "1","1" which is characteristic of the existence of characters which are not to be evaluated occurs at the outputs a5, a6 of the memory PROM.

The evaluation trigger stage BZK will be assumed to be set up appropriately by the bit combination "1","0" of the outputs a7, a8 of the memory PROM; this bit combination being characteristic of the fact that the occurring characters are letter characters. With this configuration, at the output of the NOR gate GN there occurs a binary "0" which, via the AND gate MG present at the loading input ee of the counter CNT, causes the counter CNT to receive, at its transfer inputs eu1, eu2 and eu3, the bit combination "0","0","0" present at the outputs a3, a4 of the memory PROM and the gate GN which means that the counter CNT is brought into its starting count, i.e. the zero position.

Now it will be assumed that the memory PROM is supplied with a character which represents a letter character and which is also to be taken into consideration, i.e. to be evaluated, and on the occurrence of which the bit combination "1","0" characteristic of the relevant character will be assumed to occur at the outputs a1, a2 of the memory PROM. In addition, the bit combination "0","0" which requires the occurrence of this character five times in succession in order to emit a message signal will be assumed to occur at the outputs a3, a4. At the outputs a5, a6 there now occurs an evaluation signal which has the bit combination "0", "1" which is characteristic of the evaluation of the occurred character as a letter character. As the setting of the evaluation trigger stage BZK has remained unchanged, the NOR gate GN now emits a binary "1". The bit combination "0","0","1" is therefore now present at the transfer inputs eu1, eu2, eu3 of the counter CNT. If this bit combination is considered as a binary number, it represents the decimal value 4. The counter CNT can also be loaded because a binary signal "0" is emitted from the output of the gate MG to the counter release inputs ee. This is possible because a binary "0" is supplied from the output a0 of the counter CNT. When the counter CNT has been loaded, a binary signal "1" occurs at the output a0 of the counter CNT.

When the bit combination "1", "0" is emitted from the outputs a1, a2 of the memory PROM, the memory trigger stage SSK is set up accordingly—provided it does not already occupy the corresponding position—and, in fact, with the resetting of the series-parallel converter SPU, thus shortly before the time at which the bit combination "1","0" disappears again at the outputs a1, a2 of the memory PROM. This ensures the emission, from the output of the EXCLUSIVE-OR gate BG2, of a binary signal "1" for directly following characters which are identical to the character currently being evaluated. Then, a binary signal "1" is present at all the inputs of the gate MG. This results in a binary signal "1" now being fed to the counter enabling input ee of the counter CNT. In this manner, the counter CNT has been operated appropriately in order to execute counting processes.

On the reoccurrence of the specific character, the memory PROM again emits the binary combination "1", "0" from its outputs a1, a2. The previously stated bits will be assumed to occur at the other outputs of the memory PROM. As the bit combination occurring at the outputs a1, a2 of the memory PROM is identical to the bit combination stored in the trigger stage SSK, the gate BG2, which will be assumed to be an EXCLUSIVE-OR gate, emits a binary output signal "1". In this manner, and also as the two other inputs of the AND gate MG each carry a binary signal "1", the AND gate MG emits a binary output signal "1" to the counter enabling input ee of the counter CNT which is subsequently advanced by one. Corresponding counting processes take place on each reoccurrence of the same character to be evaluated until finally the counter CNT emits a binary output signal "1" as a message signal from its output ax, indicating that the character which has been taken into consideration has occurred within the established frequency directly consecutively. Which of the two characters to be taken into consideration in the exemplary embodiment is concerned is indicated by the occurrence of a binary output signal "1" at one of the output terminals A2, A3 of the arrangement. In fact, in this case one of the two AND gates GA3 and GA4 is transmissive.

Following the process of one or all of the message signals occurring at the output terminals A1, A2, A3 of the circuit arrangement, the processing device provided for the appropriate processing emits a resetting signal by way of the input terminal E2 to the resetting input er of the counter CNT which is therefore returned to its starting count, which here is zero. If the same character which has previously occurred and which has led to the emission of the message signals then re-occurs, the counter CNT is initially set up in the above described manner and, in fact, is set at the count determined by the bit combination present at the outputs a3, a4 of the memory PROM. Then, the counter begins to execute counting processes as described above.

It will now be assumed that the counter has been set up in accordance with the bit combination present at the outputs a3, a4 of the memory PROM and has therefore been enabled to execute counting processes, or however that the counter has already executed one or more counting processes without emitting a message signal from its output ax. If a signal occurs which is not to be taken into consideration, i.e. not to be evaluated, a binary "0" occurs at each of the outputs a1-a4 of the memory PROM and a binary "1" occurs at each of the outputs a5, a6 of the memory. It will be assumed that no change occurs in the previously considered conditions regarding the setting of the evaluation trigger stage BZK. Thus, however, the NOR-gate GN emits a binary signal "0" from its output with the result that the counter CNT is reset to its starting count by way of its enabling input ee. If a character then occurs which is to be taken into consideration, i.e. it is to be evaluated as described above, the counter CNT is preset. On the reoccurrence of the same character, the counter CNT then executes counting processes as has already been described above.

Now it will be assumed that due to the first occurrence of a character which is to be taken into consideration, i.e. is to be evaluated, the counter CNT has been set up or has already executed one or more counting processes without emitting a message signal from the output ax, and that now a different character which is to be evaluated occurs. The result is that the output of the gate BG2 emits a binary signal "0" as a result of which a binary signal "0" is likewise emitted from the output of the AND gate MG to the counter enabling input ee of the counter CNT. This binary signal "0" causes the counter CNT to be preset in accordance with the binary signal "1" emitted from the output of the NOR gate GN and in accordance with the bit combination occurring at the outputs a3, a4 of the memory PROM. This presetting is characteristic of the frequency with which this currently occurring character must occur directly consecutively in order to emit an appropriate message signal from the output terminal A1. If the character which has triggered the above-explained processes re-occurs, the counter CNT, in each case, carries out a counting process such as has already been described.

In the above explanation of the mode of operation of the circuit arrangement represented in the drawing, it has been assumed that the characters which are to be taken into consideration and are thus to be evaluated have always occurred as, and that are also to be evaluated as, letter characters. As previously explained in the foregoing, the setting-up of the evaluation trigger stage BZK establishes whether the following characters are letter characters or digit characters. However, the bits occurring at the outputs a5, a6 of the memory PROM indicate whether a character is to be evaluated only as a letter character or only as a digit character, or whether differentiation is unnecessary, in which case a neutral evaluation of the relevant character is effected. This establishment in the memory PROM, on the one hand, and in the evaluation trigger stage BZK on the other hand, is necessary as the character elements of the characters are to a large extent doubly employed in accordance with the telegraph alphabet CCITT No. 2, which has been assumed to be used in this exemplary embodiment, and in fact, on the one hand, for letter characters and, on the other hand, for digit characters.

If, following the setting-up of the counter CNT or when counting has already begun in the counter CNT, the next character to occur is a character (e.g. Zi) which causes the evaluation trigger stage BZK to be reversed—this means that letter characters are to be followed for example by digit characters or (e.g. Bu) that now digit characters are to be followed by letter characters—this results in a binary signal "0" being emitted from the output of the NOR gate GN. As a result, the counter CNT is returned to its starting count. If a character which is to be evaluated and which, in accordance with the setting-up of the evaluation trigger stage BZK, is to be evaluated as a letter character or as a digit character, then occurs, this leads to the counter CNT being set up as already described above. On the re-occurrence of the same character, counting processes which have likewise been described above then take place in the counter CNT.

In the event that a neutral evaluation of the characters is to be carried out—which means that it is irrelevant whether the characters occur as letter characters or as digit characters—the outputs e5, e6 of the memory PROM carry a bit combination "0","0". In this case, the NOR gate GN emits a binary signal "1" from its output independently of the setting of the evaluation trigger stage BZK.

Finally, it should be noted that the circuit elements employed in the above-described circuit arrangement can consist of commercially available circuit elements. Therefore, a circuit of the type IM 5610 produced by Intersil can be used for the memory PROM. A commercially available counter module with the designation SN 74 LS 161 can be used for the counter CNT. The series-parallel converter SPU can be formed by a simple, pulse-controlled shift register (e.g. SN 74 LS 164). Finally, it should also be noted that, as a deviation from the conditions set forth above and represented on the drawing, the gate BG2 can consist of an EQUIVALENCE gate instead of an EXCLUSIVE-OR gate, in which case, however, the inputs of the gates must be connected to those outputs of the memory PROM and of the memory trigger stage SSK which, when identical bit combinations occur twice, carry the same bits at the outputs a1, a2 of the relevant memory PROM.

Although I have described my invention by reference to particular illustrative embodiments thereof, many changes and modifications of the invention may become apparent to those skilled in the art without departing from the spirit and scope of the invention. I therefore intend to incude within the patent warranted hereon, all such changes and modifications as may reasonably and properly be included within the scope of my contribution to the art.

I claim:

1. An arrangement for determining specific characters which occur consecutively in a sequence of characters, a sequence comprising at least one established sequence of characters in a predetermined number, and for emitting a message signal which can be used for triggering control processes only in response to the receipt of characters comprising an established sequence of character elements in the predetermined number, comprising:
   a memory adapted to receive character elements in parallel and emit corresponding parallel first control signals indicative of the sequence of character elements;
   an evaluation circuit connected to said memory and responsive to specific ones of said first control signals to provide second control signals; and
   counting means connected to said memory and to said evaluation circuit, said counting means responsive to said specific control signals and identical control signals previously supplied from said memory to execute a counting process and supply a count output representative of the received character elements and responsive to said specific control signals and differing previously-supplied control signals to reset to a predetermined count.

2. The arrangement of claim 1, comprising:
   a trigger stage connected between said memory and said counter for storing and emitting control signals as the previously-supplied control signals.

3. The arrangement of claim 2, comprising:
   character evaluation means connected between said memory and said counting means for receiving selected ones of said first control signals and responsive to said selected first control signals to indicate the type of character received and to set said counting means to corresponding positions.

4. The arrangement of claim 3, wherein said character evaluation means comprises:
   an evaluation trigger stage connected to said memory; and
   an evaluation logic circuit connected to said trigger stage, to said memory and to said counter.

5. The arrangement of claim 3, comprising:
   a memory trigger stage including inputs connected to receive some of said first control signals, and outputs;
   a first logic gate including inputs connected to an output of said memory trigger stage and in common with one of said inputs of said memory trigger stage, and an output; and
   a second logic gate including inputs, and an output connected to an enabling input of said counting means, said inputs connected to said evaluation means and to said output of said first logic gate.

6. The arrangement of claim 5, wherein:
   said counting means includes an output which emits a signal characteristic of its starting count connected to one of the inputs of said second logic gate.

7. The arrangement of claim 6, wherein said counting means comprises:
   a plurality of transfer inputs connected to said memory to receive selected ones of said first control signals for setting said counting means for a new counting process when the accompanying other first control signals, via said evaluation circuit, either differ from the previously occurred first control signals or occur following the absence of first control signals; and
   a message output for emitting an output signal indicating complete reception and evaluation of a character.

8. The arrangement of claim 7, comprising:
   third and fourth logic gates each having a message signal output and each having a first input commonly connected to said message output of said counting means, and a second input connected to respective outputs of said memory trigger stage for providing message signals in response to the character elements being received in a predetermined number.

9. The arrangement of claim 8, wherein said counting means comprises:
   a reset input for receiving a reset signal.

10. The arrangement of claim 1, wherein:
    said memory is a plug-in read only memory.

11. The arrangement of claim 1, wherein:
    said memory is a programmable read only memory.

12. The arrangement of claim 1, comprising:
    a series-parallel converter including an input for receiving the character elements in series and outputs connected to and feeding said memory in parallel.

* * * * *